United States Patent [19]

Gorrissen

[11] 3,930,067

[45] Dec. 30, 1975

[54] METHOD OF PROVIDING POLYCRYSTALLINE LAYERS OF ELEMENTTARY SUBSTANCES ON SUBSTRATES

[75] Inventor: Jan Gorrissen, Eindhoven, Netherlands

[73] Assignee: U.S. Philips Corporation, New York, N.Y.

[22] Filed: Oct. 18, 1972

[21] Appl. No.: 298,624

Related U.S. Application Data

[63] Continuation of Ser. No. 90,060, Sept. 29, 1970, abandoned, which is a continuation of Ser. No. 871,592, Nov. 10, 1969, abandoned, which is a continuation of Ser. No. 630,842, April 14, 1967, abandoned.

[30] Foreign Application Priority Data

Apr. 16, 1966  Netherlands...................... 6605144

[52] U.S. Cl. .................... 427/86; 427/82; 427/122; 427/95
[51] Int. Cl.² ........................................... B05D 5/12
[58] Field of Search............ 117/106 A, 106 C, 215, 117/217; 427/86, 122, 82, 95

[56] References Cited

UNITED STATES PATENTS

| 3,011,912 | 12/1961 | Gareis et al..................... 117/106 C |
| 3,382,113 | 5/1968 | Ebert et al....................... 117/106 C |
| 3,385,729 | 5/1968 | Larchian............................ 117/215 |
| 3,386,866 | 6/1968 | Ebert et al....................... 117/106 C |
| 3,393,349 | 7/1968 | Huffman............................ 317/101 |
| 3,484,311 | 12/1969 | Benzing............................ 117/201 |
| 3,508,962 | 4/1970 | Manasevit et al.................. 117/227 |

*Primary Examiner*—Cameron K. Weiffenbach
*Attorney, Agent, or Firm*—Frank R. Trifari; Carl P. Steinhauser

[57] ABSTRACT

A method of providing a polycrystalline layer of silicon on a silicon substrate having a surface oxide layer. A carrier gas containing a decomposable hydrogen compound of carbon or silicon is passed over the substrate while the substrate is heated at the decomposition temperature of the hydrogen compound, with the result that a dense nucleation layer is deposited. A reducible silicon compound is then introduced into the carrier gas in the presence of hydrogen to cause the silicon compound to be reduced releasing silicon which is deposited on the nucleation layer as a layer polycrystalline silicon which is even and uniform.

2 Claims, No Drawings

METHOD OF PROVIDING POLYCRYSTALLINE LAYERS OF ELEMENTTARY SUBSTANCES ON SUBSTRATES

This application is a continuation of application Ser. No. 90,060, filed Sept. 29, 1970, now abandoned, which was a continuation of application Ser. No. 871,592, filed Nov. 10, 1969, now abandoned, which was a continuation of application Ser. No. 630,842, filed Apr. 14, 1967, now abandoned.

The invention relates to a method of providing polycrystalline layers of elementary substances on substrates.

It is known that elements can be vapour-deposited directly on substrates in the form of polycrystalline layers. Alternatively, elements may be deposited on substrates from the vapour of compounds, for example, $WCl_6$ and $ZrJ_4$, by dissociation at elevated temperatures. These methods, however, must be carried out in an evacuated space.

It is known in addition that layers of elements can be provided from the vapour of decomposable compounds thereof, for example, silane and butane, on substrates which are heated above the decomposition temperature of the compounds. In this case it is not necessary to perform the process in a vacuum, however of a small number of elements only the volatile compounds suitable for this purpose are available. In addition, these starting substances are very reactive and sometimes, in the case of $SiH_4$, even explosive.

Even, polycrystalline layers can be obtained by all the above-described processes independent of the composition of the substrate material.

In addition a method is known in which by a chemical reaction, in particular by reduction with hydrogen, elements are deposited from the vapour of compounds thereof from a gas mixture on substrates which are heated to the reaction temperature. In this case the hydrogen may also serve as a carrier gas for the vapour of the compound. If desired, however, a neutral carrier gas, for example, argon, may alternatively be used.

An advantage of this latter method is that the activities can be carried out continuously and at any desired gas pressure, preferably at approximately atmospheric pressure. In addition, the compounds concerned, often halides, are amply available.

In connection herewith the normal practice is directed to this method of providing polycrystalline layers of elements on substrates. Methods of doping the layers with small quantities of other elements for influencing the properties are also developed to a high degree of perfectness for this last method. This is especially the case for influencing the electric properties for use in circuit elements, for example, resistors, capacities, diodes and transistors.

A drawback of this method is, however, that even layers cannot be obtained as such on all substrate materials independent of their compositions.

Few difficulties are encounted, for example, in this respect in depositing the polycrystalline layers on substrates consisting of elementary substances, for example, silicon, carbon and metals having a melting-point which is sufficiently high to withstand the reaction temperature.

However, an even deposition is not obtained in this manner on other high-melting-point materials consisting of compounds, in particular oxidic compounds, for example, ceramic materials, such as steatite, aluminium oxide, zirconium oxide and in addition quartz, quartz glass and silicon nitride.

However, it is just these insulating substances which are of great importance as substrate materials in manufacturing electric circuit elements.

It is the object of the invention to remove the drawback of the last described method so that it becomes possible to obtain even, polychrystalline layers with this method on substrate materials consisting of high-melting-point compounds, in particular on oxidic substrate materials.

During investigations which have resulted in the invention it has been found that on these substrate materials nuclei on which deposits of elementary substances may take place occur at mutually comparatively large distances, for example, a few tens of microns, and that in using the method in which elements are deposited by chemical reaction of compounds from a gas mixture a sufficiently dense nucleation is not formed in the first instance.

In contrast herewith the nucleation on substances consisting of elementary substances is much denser and a sufficiently dense nucleation is also obtained by direct deposition of elements by dissociation or by thermal decomposition from the vapour of compounds of the elements on all the substrate materials. The mutual distance of the crystallisation nuclei in this case may be only a few tens of Angstroms.

As a result of the poor nucleation when using the method in which elements are deposited by a chemical reaction from a gas mixture on substrates consisting of high-melting-point compounds, a coarse-granular layer of the elements is built up in the first instance. The resulting unevenness continues with larger layer thickness and even increases as a result of the anisotropy in the rate of growth of the crystals.

The invention relates to a method of providing polycrystalline layers of elements on substrates in which by a chemical reaction, in particular by reduction with hydrogen, the elements are deposited from the vapour of compounds thereof from a gas mixture onto substrates which are heated at the reaction temperature and is characterized in that the layers are deposited on substrates which consist at least superficially of a compound, in particular an oxidic compound, that on these substrates a dense nucleation is produced by depositing elements which are not liberated by a chemical reaction from compounds and that subsequently the polycrystalline layers are deposited.

This production of a dense nucleation may be carried out by vapour-depositing elements directly in known manner or by dissociation of compounds. However, it is to be preferred that the nucleation is effected by known thermal dissociation of vapour of compounds thereof, because this can be carried out by the addition of vapour of a thermally dissociable compound to the gas from which the polycrystalline layer is deposited.

This can be effected by adding vapour of the thermally dissociable compound to the carrier gas and, only after a sufficient nucleation has been effected, adding the compound to be decomposed chemically from which compound the polycrystalline layer is deposited.

Preferably, however, a small quantity of the dissociable compound is included, in an initial stage of depositing the layer, in the gas current which contains the compound from which the layer is built up by chemical reaction.

An advantage hereof is that the process can be carried out continuously in the same gas current and that in manufacturing very thick layers irregularities of the layer as a result of anisotropy in the crystal growth can be checked simply by an intermediate repitition of the nucleation operation by adding the dissociable compound to the gas current.

Very little material is required to obtain a dense nucleation. Therefore it usually is of little importance for the properties of the polycrystalline layer if the nucleation is effected by a substance other than that from which the layer is built up.

First of all are to be considered hydrogen compounds, for example silane and butane, which give a nucleation of Si-atoms and C-atoms, respectively, but also alkyl silanes, for example, $SiH_3 CH_3$, which form nuclei of Si and SiC.

In order to check any incorporation of foreign substances in the polycrystalline layers, however, preferably, and if possible, the same element is chosen for the nucleation as that from which the layer is built up. In manufacturing Si-layers, for example, $SiH_4$ may be used for the nucleation.

The method according to the invention may be used for the manufacture of polycrystalline layers of all kinds of elements which can be released by reduction with hydrogen from compounds, in particular of halogen compounds, for example, Si, B, W and Ta.

In many cases, for example, in the formation of layers of W and Ta, suitable and sufficiently volatile compounds which can produce a dense nucleation in a gas current are not available. In those cases hydrocarbons are used, for example, or, if this is less desirable in connection with contamination of the layer, the required nucleation may be effected previously by direct vapour-deposition on the substrates.

For instance W may be vapour-deposited on a substrate by heating for about half an hour W to a temperature of about 3200° C in a vacuum of substantially $10^{-7}$ mm Hg, the distance between the W and the substrate being about 10 cm. Ta may be vapour-deposited in substantially the same way, the temperature in this case being about 2850° C. In an argon atmosphere of $10^{-2}$ mm Hg, W or Ta may be deposited in a substrate by sputtering, the distance between the W or Ta and the substrate being about 2½ cm, the W or Ta being at a potential of about −2000 volts with respect to the substrate. After 10 minutes a sufficient dense nucleation is obtained.

It is to be noted that the invention is of particular importance for the semiconductor technology since by means of a method according to the invention particularly readily reproducible polycrystalline silicon layers (average grain diameter, for example, a few microns or less) can be provided on electrically insulating substrates after which by local diffusion of activators semiconductor circuit elements can be provided in such a polychristalline silicon layer which, as a result of the large sheet resistance of the polycrystalline silicon layer, are very readily insulated electrically from one another.

In order that the invention may readily be carried into effect it will now be described in greater detail with reference to the following specific examples.

EXAMPLE 1

Starting material is a substrate consisting of a silicon crystal in the form of a wafer having a diameter of 25 mms and a thickness of 400 microns on which, by heating in moist oxygen at 1200° C, a silicon oxide layer of 0.5 micron is provided.

This substrate is heated in a quartz tube at 1000°C in a hydrogen current of 1 liter per minute. 1% by volume of vapour of methyl silane ($SiH_3 CH_3$) is added to the gas current. A dense nucleation consisting of silicon and silicon carbide is produced on the silicon oxide surface by continued heating for 5 seconds, the mutual distance between the nucleation center being a few hundreds of Angstrom.

A dense nucleation consisting of silicon only may be obtained by heating in a quartz tube the substrate in a hydrogen current of 1 liter per minute, 1% by volume of vapour of silane ($SiH_4$) being added to the hydrogen current, in such a way that in a few minutes a temperature of substantially 1000°C is reached.

Then the temperature of the substrate is increased to 1150°C and 1% by volume of silicon chloride, instead of the methyl silane, is added to the gas current. Now an even, finegranular polycrystalline silicon layer of 10 microns grows on the substrate. The rate of growth is 0.7 micron per minute.

EXAMPLE 2

A silicon crystal having the same dimensions as that of example 1 is heated at 1200° C in a current of 1 liter per minute of hydrogen mixed with 5.3% by volume of carbonic acid ($CO_2$) and 1% by volume of silicon chloride. As a result of this a coating with silicon oxide of 1 micron thickness is built up in 10 minutes.

The supply of carbonic acid and silicon chloride is then discontinued and instead of this 2% by volume of butane is added to the hydrogen current for 1 minute. By decomposition of the butane a dense nucleation of carbon is formed on the silicon oxide surface.

The butane supply is then discontinued and 5% by volume of silicon chloride is added to the hydrogen, An even, fine-granular layer of silicon grows. The rate of growth of the polychrystalline silicon is 3 microns per minute.

The butane and the silicon chloride may be added to the hydrogen simultaneously during the first minute after which the butane supply is discontinued. Also in this way a dense nucleation of carbon is formed.

By adding 2% by volume of butane to the gas current every 15 minutes during 1 minute so that an interim dense nucleation is effected, thick, even polycrystalline layers, thickness for example, 200 microns, can be obtained.

By local diffusion of activators semiconductor circuit elements can be provided in polycrystalline silicon layers obtained by means of the methods as described in examples 1 and 2.

EXAMPLE 3

A wafer of transparent aluminium oxide, diameter 25 mms is heated to 1000° C in a hydrogen current of 1 liter per minute. 0.5% by volume of methyl silane ($SiH_3 CH_3$) is added to the hydrogen and the mixture is heated for 5 seconds as a result of which a dense nucleation of silicon and silicon carbide is formed. After discontinuing the supply of methyl silane, heating is effected at 1225°C for 5 minutes in a current of 1200 cm³ of hydrogen and 10 cm³ of boron chloride ($BCl_3$) in vapour form. An even polycrystalline boron layer grows at a rate of 1 micron per minute.

What I claim is:

1. A method of providing an even fine-granular polycrystalline silicon layer on a silicon oxide substrate comprising the steps of passing over the substrate a gas current containing a thermally decomposable hydrogen compound selected from the group consisting of alkylsilanes and butane in an excess of hydrogen while heating the substrate at the decomposition temperature of said hydrogen compound to deposit on the surface layer a dense layer containing silicon or carbon in elementary form, thereafter passing over the substrate a gas current containing silicon chloride and hydrogen while heating the substrate at the decomposition temperature of silicon chloride temperature to continue to deposit on the silicon or carbon layer a polycrystalline layer of silicon.

2. A method as claimed in claim 1 in which the alkyl silane is methyl silane.

* * * * *

UNITED STATES PATENT AND TRADEMARK OFFICE
CERTIFICATE OF CORRECTION

PATENT NO. : 3,930,067
DATED : December 30, 1975
INVENTOR(S) : JAN GORRISSEN

It is certified that error appears in the above-identified patent and that said Letters Patent are hereby corrected as shown below:

On the title page, section [63], line 1, "Sept. 29, 1970" should read --Nov. 16, 1970--;

Col. 1, line 6, delete "Sept. 29, 1970" and insert --Nov. 16, 1970 --.

Col. 1, line 18, change "$ZrJ_4$" to --$ZrI_4$--

Col. 1, line 31, after "Even" cancel the comma ","

Col. 1, line 52, change "perfectness" to --perfection--

Col. 1, line 55, change "capacities" to --capacitors--

Col. 1, line 59, change "encounted" to --encountered--;

Col. 2, line 8, change "polychrystalline" --polycrystalline--

Col. 3, line 58, change "polychristalline" to --polycristalline--

Col, 4, line 57, change "aluminium" to --aluminum--;

Signed and Sealed this

Twenty-seventh Day of July 1976

[SEAL]

Attest:

RUTH C. MASON
*Attesting Officer*

C. MARSHALL DANN
*Commissioner of Patents and Trademarks*